(12) United States Patent
Govande et al.

(10) Patent No.: US 11,537,463 B1
(45) Date of Patent: Dec. 27, 2022

(54) DATA INTEGRITY VERIFICATION OPTIMIZED AT UNIT LEVEL

(71) Applicant: Seagate Technology LLC, Fremont, CA (US)

(72) Inventors: Nilesh Govande, Pune (IN); Rajesh Nambiar, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/378,177

(22) Filed: Jul. 16, 2021

(51) Int. Cl.
*H03M 13/00* (2006.01)
*G06F 11/10* (2006.01)
*G06F 11/30* (2006.01)
*G06F 11/07* (2006.01)

(52) U.S. Cl.
CPC ...... *G06F 11/1004* (2013.01); *G06F 11/0772* (2013.01); *G06F 11/1068* (2013.01); *G06F 11/3034* (2013.01)

(58) Field of Classification Search
CPC ............ G06F 11/1004; G06F 11/3034; G06F 11/0772; G06F 11/1068
See application file for complete search history.

(56) References Cited

U.S. PATENT DOCUMENTS

| | | | |
|---|---|---|---|
| 6,963,982 B1 | 11/2005 | Brustoloni et al. | |
| 10,169,577 B1 | 1/2019 | Sobel et al. | |
| 2003/0097481 A1* | 5/2003 | Richter | H04L 43/00 709/251 |
| 2016/0301718 A1 | 10/2016 | Imbimbo et al. | |
| 2016/0335437 A1 | 11/2016 | Yang et al. | |
| 2019/0306040 A1* | 10/2019 | Hui | H04L 61/58 |

* cited by examiner

*Primary Examiner* — Samir W Rizk
(74) *Attorney, Agent, or Firm* — Holzer Patel Drennan (57) ABSTRACT

The technology disclosed herein pertains to a system for data integrity verification that is optimized at unit level. One or more implementations of such system include a method including identifying a first unit boundary in data block received from a client at an application layer, the unit boundary indicating end of a first unit of data, generating an intermediate checksum for the first unit of data at the application layer, receiving a second unit of data of the data block at the application layer, and generating a final checksum with an intermediate checksum as a basis and the second unit of data.

20 Claims, 7 Drawing Sheets

DATA INTEGRITY VERIFICATION OPTIMIZED AT UNIT LEVEL

BACKGROUND

Different computer system configuration have been provided to offer managed cloud services to customers. With managed cloud services, a provider of computing services has engineers who manage not only the customers' computing, storage, networks, and operating systems, but also the complex tools and application stacks that run on top of that infrastructure. In a managed cloud, it is paramount to provide a secure, traceable, and trusted computing environment via technical measures. Processes including authentication, authorization, and accounting, enforced by software or other technical elements, are considered important for effective network management and security.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system for data integrity verification that is optimized at unit level. One or more implementations of such system include a method including identifying a first unit boundary in data block received from a client at an application layer, the unit boundary indicating end of a first unit of data, generating an intermediate checksum for the first unit of data at the application layer, receiving second unit of data of the data block at the application layer, and generating a final checksum with an intermediate checksum as a basis and the second unit of data.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

In implementations of cloud based services, an application layer interacts with clients to receive various data requests and communicates with a storage layer to execute the data requests. The application layers may generate a lot of data to the storage layer in managing such client requests. However, due to undesired and/or unexpected behavior of the software/hardware, it may happen that data stored may be corrupted. Specifically, a client can send a checksum, such as an MD5 checksum and the application layer has to confirm the checksum by recomputing it for any object data received in a PUT object request from the client. In some implementations, the application layer may also calculate a checksum of a complete object while processing the PUT request and store the checksum in the object's metadata. However, in such implementations, in case of a caching corruption for a range read from the storage layer, it may be necessary to read the entire object, which is expensive in terms of time and resources. Furthermore, in such implementations, the applications are able to detect complete object corruption only at the end of the read operation.

In one or more implementations disclosed herein, the application layer is configured to store checksum of objects at smaller granularity than at complete object level and to retrieve the same. For example, in one implementation, the granularity level is set at the data unit size, where a unit is a minimum predefined size data packet that is exchanged between the application layer and the storage layer. For example, the unit size may be one (1) megabyte (MB). As a result, it is possible to identify corruption at unit size level granularity. Furthermore, the integrity of a range read from the storage layer may be checked by precisely reading specific unit size of data and verifying the checksum at the unit size instead of reading the entire object.

Figure 1:
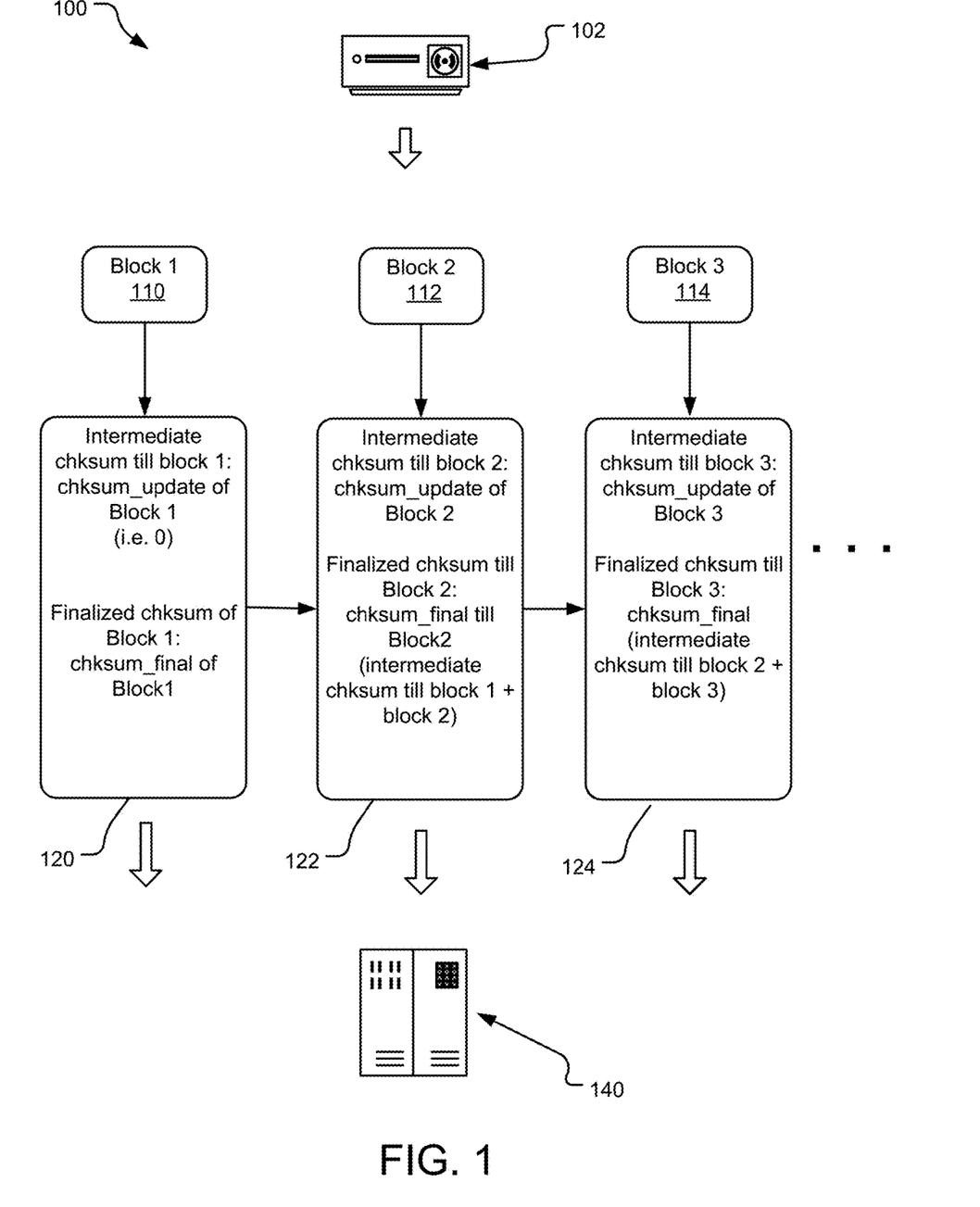
FIG. 1 illustrates an example block diagram of the data integrity system disclosed herein.

FIG. 1 illustrates a block diagram of the data integrity system 100 disclosed herein. The data integrity system 100 may be implemented to store data objects received from a client 102 to a cloud based storage layer 140. For example, the data object may be communicated by the client 102 to an application layer as a series of data blocks. In one implementation, each data block may be of a size of a unit, such as 1 MB. An application layer that receives the data blocks calculates checksums at unit size boundary. For example, the checksum may be an MD5 checksum, which is a 32-character hexadecimal number that is computed on the block. Specifically, for each given block passed to the application layer, the application layer passes down all previous units' aggregated intermediate and the given blocks finalized checksum to the storage layer 140.

Thus, when the application layer received block 1 110, it calculates a checksum on the block 1. At 120, the application layer passes down checksum_update of block 1, which is 0 and finalized checksum of block 1 to the storage layer 140. Subsequently, as block 2 112 is received, the application layer calculates an intermediate checksum of the data received till block 2 112. As shown at 122, the application layer passes down the intermediate checksum of the 1 MB of data computed at 120 and a finalized checksum of the combination of the intermediate checksum till block 1 and the 1 MB of data of block 2 112.

Subsequently, as block 3 114 is received, the application layer calculates an intermediate checksum of the data received till block 3 114. As shown at 124, the application layer passes down the intermediate checksum of the 1 MB of data computed at 122 and a finalized checksum of the combination of the intermediate checksum till block 2 and the 1 MB of data of block 3 114. This process is repeated iteratively until all blocks of an object of data received from the client are received.

Figure 2:
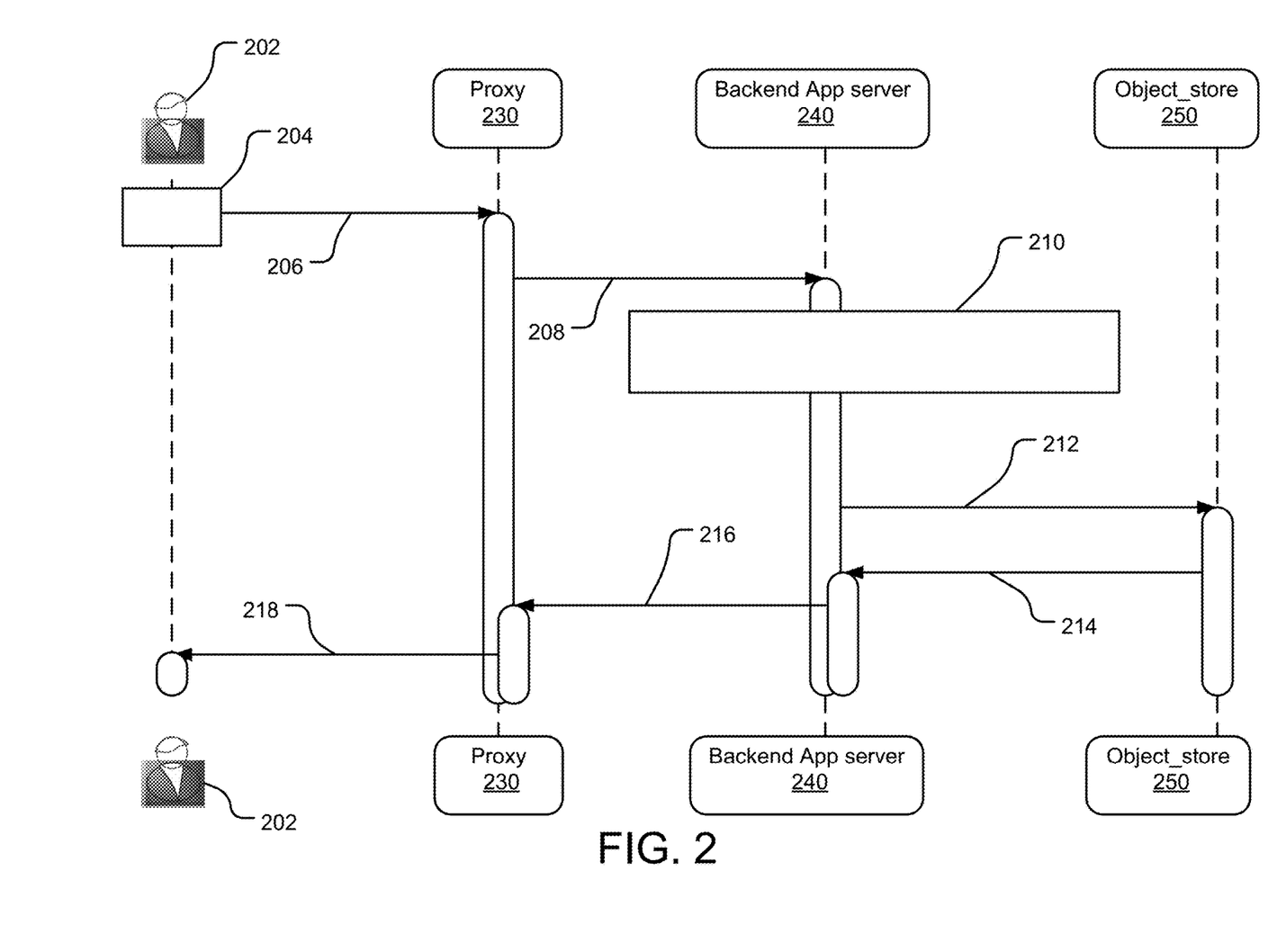
FIG. 2 illustrates example state diagram of the data integrity system disclosed herein for executing a put operation.

FIG. 2 illustrates example state diagram 200 of the data integrity system disclosed herein for executing a put operation. At operation 206, a client 202 uploads an object 204 to object storage. For example, the operation 206 may be a PUT operation that identifies a host endpoint for the object 204 via an http command to a proxy server 230. At 208, the proxy server 230 may communicate the PUT request to a backend application server 240. At 210, the backend application server 240 calculates checksum at unit size boundary in the manner described in FIG. 1 above. At 212, the backend application server 212 may make an object store system call to write the data and the intermediate and final checksums to an object store 250. At 214, the object store 250 sends a PUT success acknowledgement to the backend application server 240, which is communicated via PUT success acknowledgements 216 and 218 back to the client 202.

Figure 3:
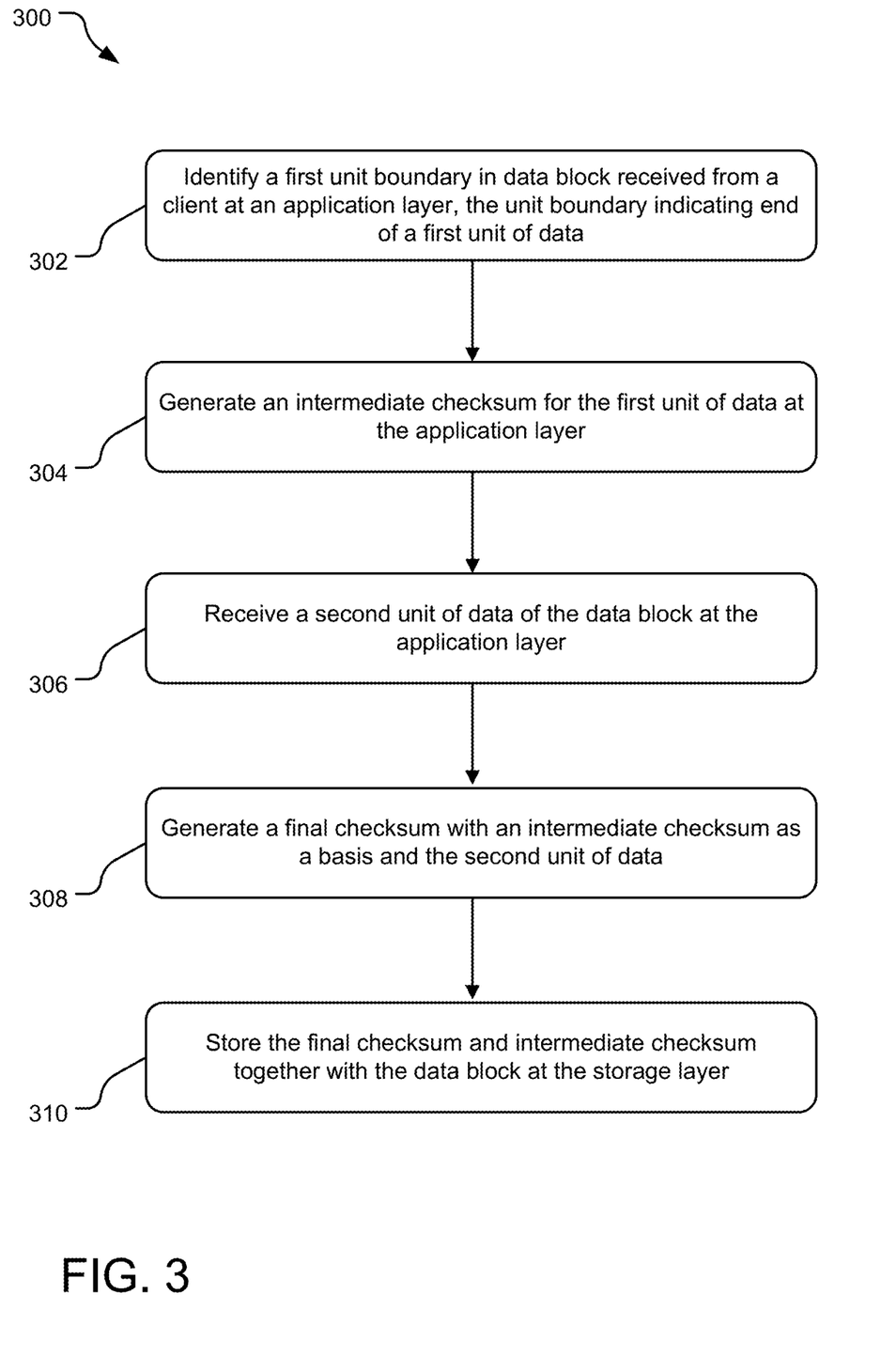
FIG. 3 illustrates example operations for executing a put operation by the data integrity system disclosed herein.

FIG. 3 illustrates example operations 300 for executing a put operation by the data integrity system disclosed herein. An operation 302 identifies a first unit boundary in data block received from a client at an application layer, the unit boundary indicating end of a first unit of data. An operation 304 generates an intermediate checksum for the first unit of data at the application layer. An operation 306 receives a second unit of data of the data block at the application layer. An operation 308 generates a final checksum with an intermediate checksum as a basis and the second unit of data. An operation 310 stores the final checksum and intermediate checksum together with the data block at the storage layer.

Figure 4:
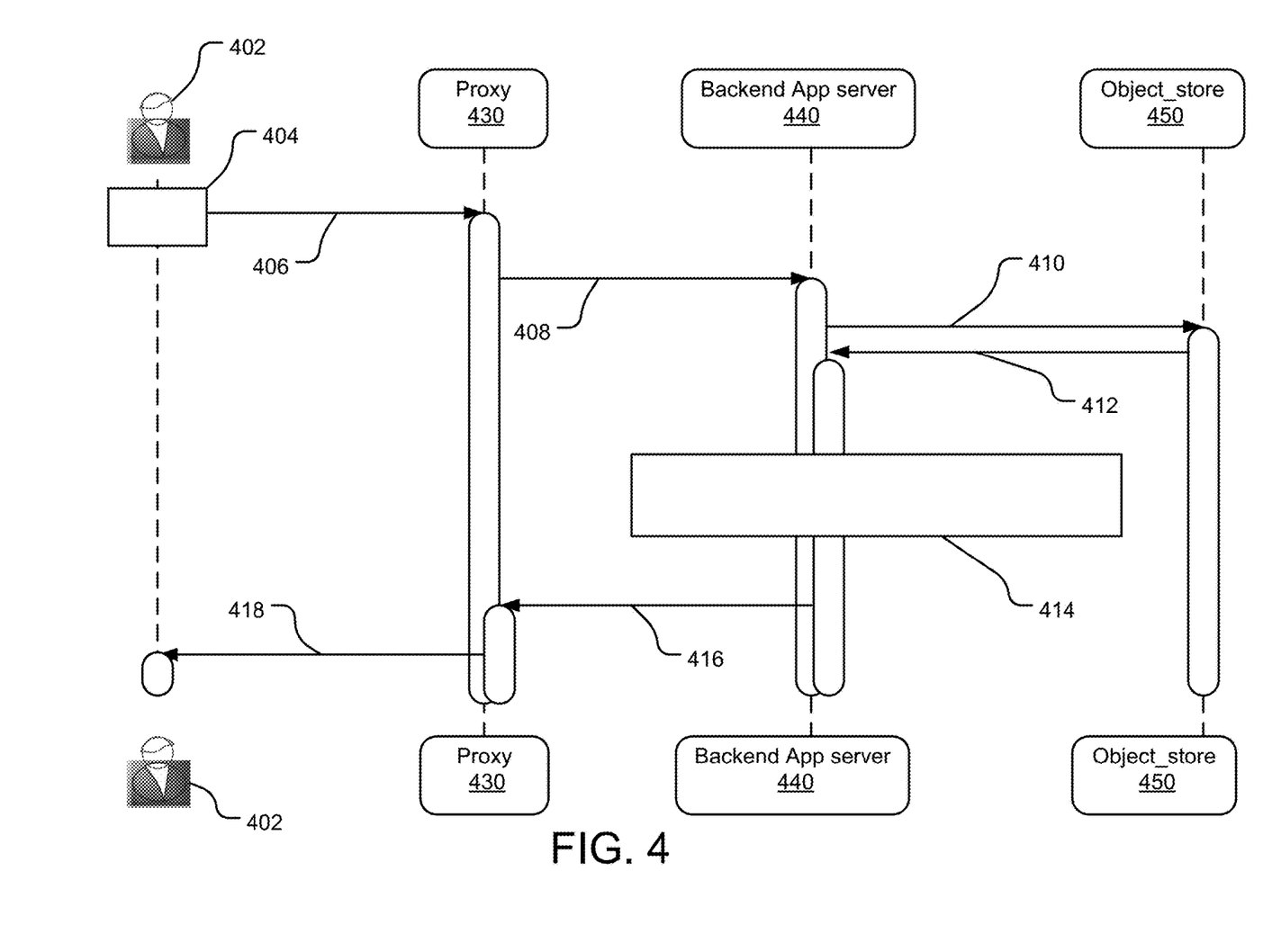
FIG. 4 illustrates example state diagram of the data integrity system disclosed herein for executing a get operation.

FIG. 4 illustrates a state diagram 400 of the data integrity system disclosed herein for executing a get operation. At operation 406, a client 402 sends a GET object command 404 from an object storage. For example, the operation 406 may be a GET operation that identifies a host endpoint for the object via an http command to a proxy server 430. At 408, the proxy server 430 may communicate the GET request to a backend application server 440. At 410, the backend application server makes a system call to the object store 450 to read data and its related checksum. At 412, the object store 450 may send the data along with the checksum to the backend application server. At 414, the backend application server 440 updates the data unit checksum received from the object store with that of the unit of data to generate a finalized checksum and compares the finalized checksum with the final checksum received from the object store for all data units. In case of checksum validation failure, at 416, the backend application server 440 sends an error or a data corruption flag to the proxy 430, which is communicated to the client 402 at 418.

Figure 5:
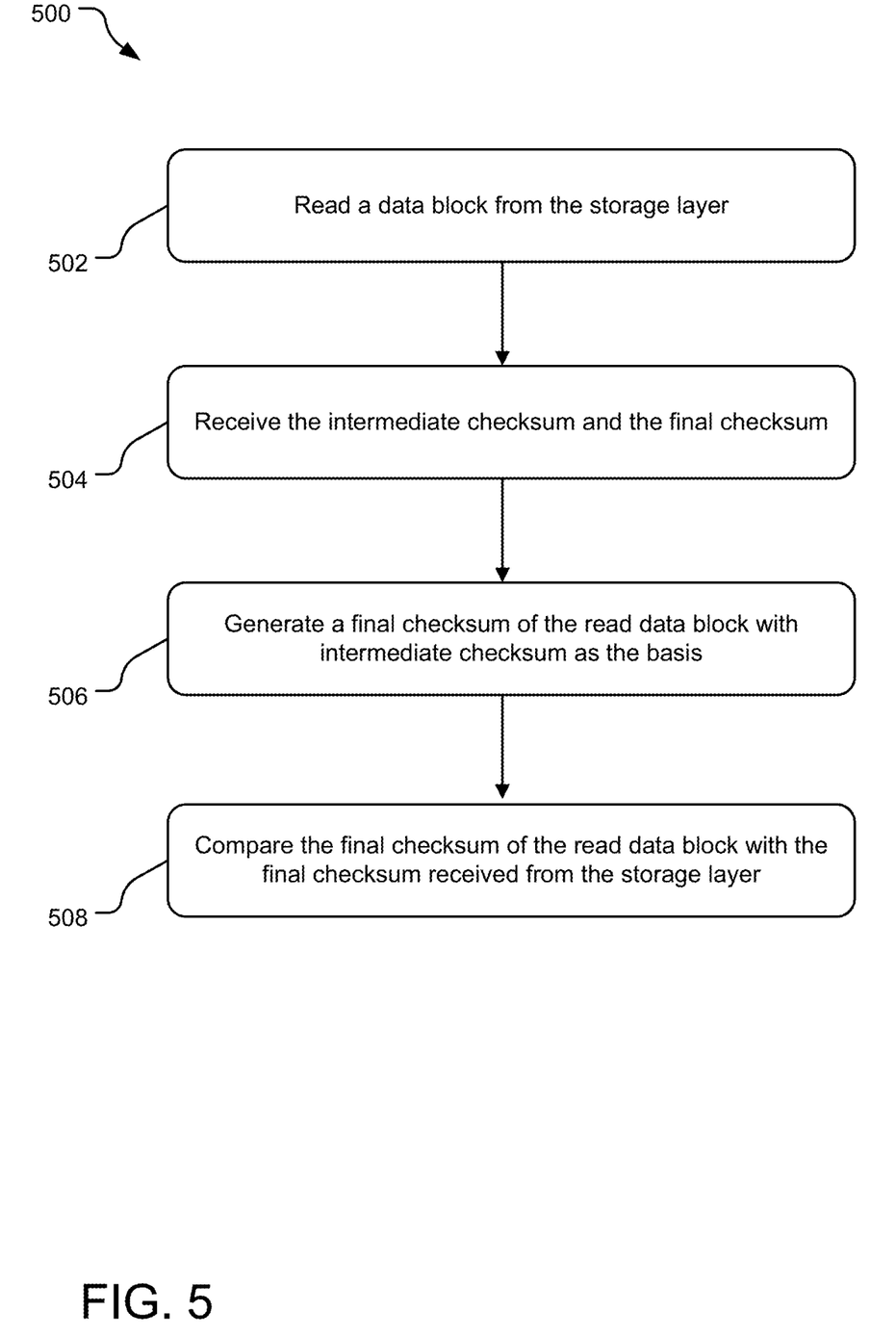
FIG. 5 illustrates example operations for executing a get operation by the data integrity system disclosed herein.

FIG. 5 illustrates operations 500 for executing a get operation by the data integrity system disclosed herein. An operation 502 reads a data block from a storage layer. Subsequently, an operation 504 receives the intermediate checksum and the final checksum from the storage layer. An operation 506 generates a final checksum of the read data block with intermediate checksum as the basis. Finally, an operation 508 compares the final checksum of the read data block with the final checksum received from the storage layer.

Figure 6:
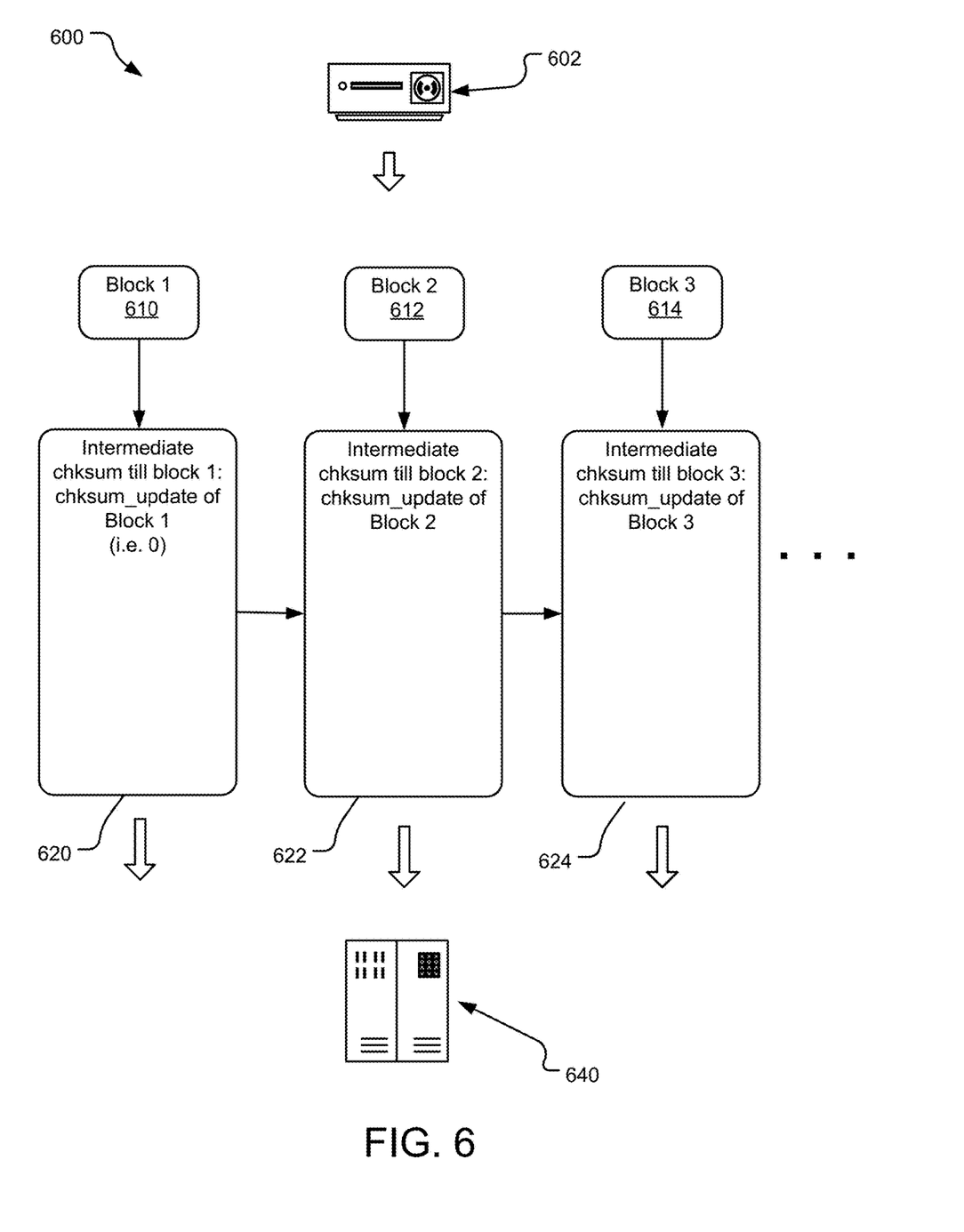
FIG. 6 illustrates an alternative example block diagram of the data integrity system disclosed herein.

FIG. 6 illustrates an alternative block diagram of the data integrity system 600 disclosed herein. For the data integrity system 600, for each block or segment, only an intermediate checksum is stored. Subsequently, while reading the data, the storage layer needs to return the previous block or segment's intermediate checksum as well. Here, the aggregated intermediate checksums are used to detect and data corruption.

The data integrity system 600 may be implemented to store data objects received from a client 602 to a cloud based storage layer 640. For example, the data object may be communicated by the client 602 to an application layer as a series of data blocks. In one implementation, each data block may be of a size of a unit, such as 1 MB. An application layer that receives the data blocks calculates checksums at unit size boundary. For example, the checksum may be an MD5 checksum, which is a 32-character hexadecimal number that is computed on the block. Specifically, for each given block passed to the application layer, the application layer passes down all previous units' aggregated intermediate and the given blocks finalized checksum to the storage layer 640.

Thus, when the application layer received block 1 610, it calculates an intermediate checksum on the block 1. At 620, the application layer passes down the intermediate checksum_update of block 1, which is 0 to the storage layer 640. Subsequently, as block 2 612 is received, the application layer calculates an intermediate checksum of the data received till block 2 612. As shown at 622, the application layer passes down the intermediate checksum of the 1 MB of data of block 2 612 to the storage layer 640.

Subsequently, as block 3 614 is received, the application layer calculates an intermediate checksum of the data received till block 3 614. As shown at 624, the application layer passes down the intermediate checksum of the 1 MB of data of block 3 614. This process is repeated iteratively until all blocks of an object of data received from the client are received.

Figure 7:
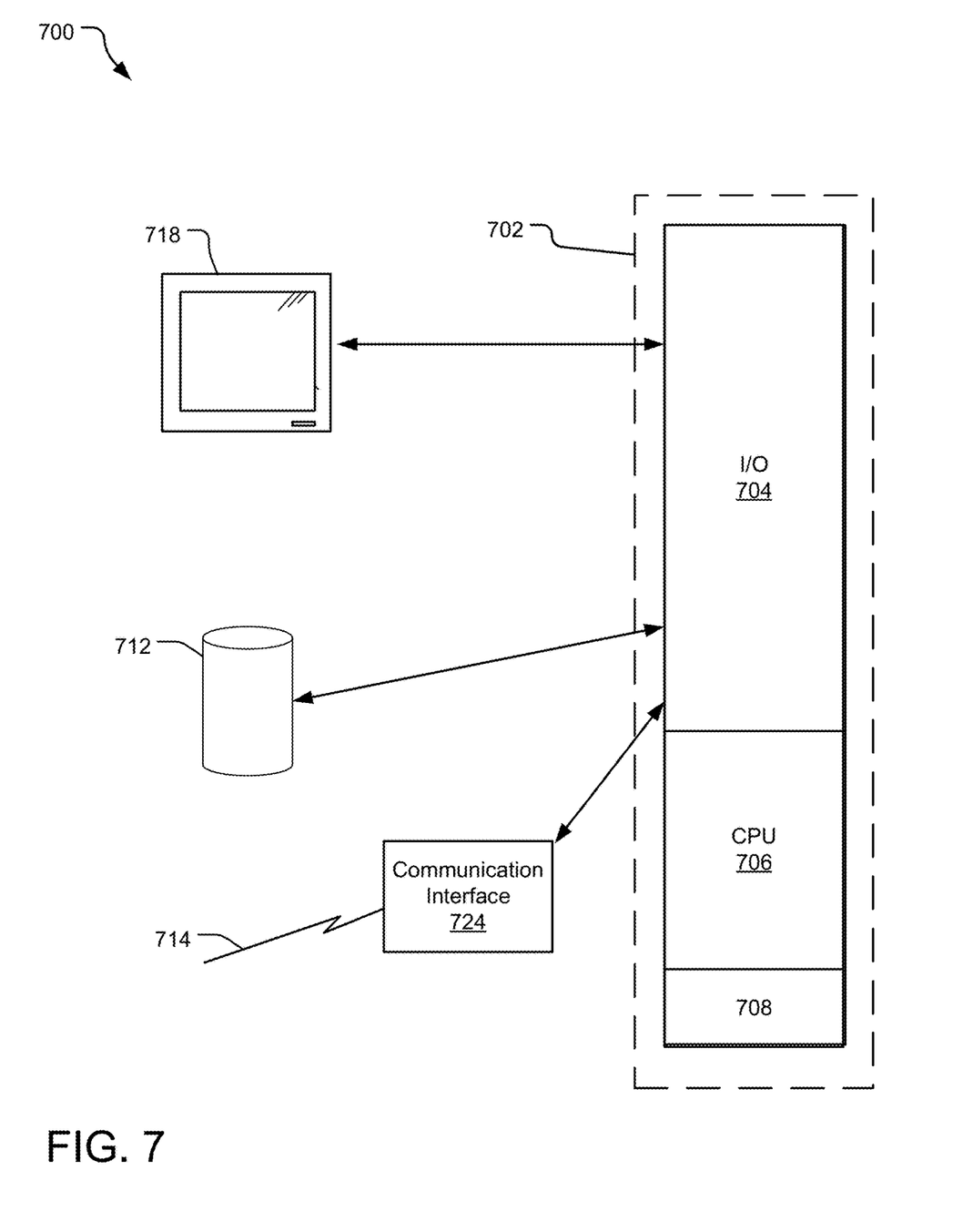
FIG. 7 illustrates an example processing system that may be useful in implementing the described technology.

FIG. 7 illustrates an example processing system 700 that may be useful in implementing the described technology. The processing system 700 is capable of executing a computer program product embodied in a tangible computer-readable storage medium to execute a computer process. Data and program files may be input to the processing system 700, which reads the files and executes the programs therein using one or more processors (CPUs or GPUs). Some of the elements of a processing system 700 are shown in FIG. 7 wherein a processor 702 is shown having an input/output (I/O) section 704, a Central Processing Unit (CPU) 706, and a memory section 708. There may be one or more processors 702, such that the processor 702 of the processing system 700 comprises a single central-processing unit 706, or a plurality of processing units. The processors may be single core or multi-core processors. The processing system 700 may be a conventional computer, a distributed computer, or any other type of computer. The described technology is optionally implemented in software loaded in memory 708, a storage unit 712, and/or communicated via a wired or wireless network link 714 on a carrier signal (e.g., Ethernet, 3G wireless, 8G wireless, LTE (Long Term Evolution)) thereby transforming the processing system 700 in FIG. 7 to a special purpose machine for implementing the described operations. The processing system 700 may be an application specific processing system configured for supporting a distributed ledger. In other words, the processing system 700 may be a ledger node.

The I/O section 704 may be connected to one or more user-interface devices (e.g., a keyboard, a touch-screen display unit 718, etc.) or a storage unit 712. Computer program products containing mechanisms to effectuate the systems and methods in accordance with the described technology may reside in the memory section 708 or on the storage unit 712 of such a system 700.

A communication interface 724 is capable of connecting the processing system 700 to an enterprise network via the network link 714, through which the computer system can receive instructions and data embodied in a carrier wave. When used in a local area networking (LAN) environment, the processing system 700 is connected (by wired connection or wirelessly) to a local network through the communication interface 724, which is one type of communications device. When used in a wide-area-networking (WAN) environment, the processing system 700 typically includes a modem, a network adapter, or any other type of communications device for establishing communications over the wide area network. In a networked environment, program modules depicted relative to the processing system 700 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 708 and/or the storage unit 712 and executed by the processor 702. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 708 and/or the storage unit 712 and executed by the processor 702.

The processing system 700 may be implemented in a device, such as a user device, storage device, IoT device, a desktop, laptop, computing device. The processing system 700 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:
1. A method, comprising:
identifying a first unit boundary in a data block received from a client at an application layer, the first unit boundary indicating an end of a first unit of data;
generating an intermediate checksum based on the first unit of data at the application layer;
receiving a second unit of data of the data block at the application layer;
generating a final checksum with the intermediate checksum and the second unit of data as a basis; and
transmitting the second unit of data, the final checksum, and the intermediate checksum from the application layer to a storage layer for storing the final checksum and the intermediate checksum in association with the second unit of data.

2. The method of claim 1, further comprising storing the final checksum and intermediate checksum together with the data block at the storage layer.

3. The method of claim 2, wherein each of the intermediate checksum and the final checksum is an MD5 checksum.

4. The method of claim 2, further comprising:
reading the data block from the storage layer;
receiving the intermediate checksum and the final checksum from the storage layer; and
generating a final checksum of the read data block with intermediate checksum as the basis.

5. The method of claim 4, further comprising comparing the final checksum of the read data block with the final checksum received from the storage layer.

6. The method of claim 5, further comprising:
in response to determining that the final checksum of the read data block does not match with the final checksum received from the application layer, generating a data corruption error flag.

7. The method of claim 1, further comprising adding unit identity of each of the first unit of data and the second unit of data during computation of checksum.

8. A device, comprising:
memory;
one or more processor units;
a backend application layer stored in the memory and executable by the one or more processor units, the backend application layer encoding computer-executable instructions on the memory for executing on the one or more processor units a computer process, the computer process comprising:
identifying a first unit boundary in a data block received from a client at the backend application layer, the first unit boundary indicating an end of a first unit of data;
generating an intermediate checksum based on the first unit of data at the backend application layer;
receiving a second unit of data of the data block at the backend application layer;
generating a final checksum with the intermediate checksum and the second unit as a basis; and
transmitting the second unit of data, the final checksum, and the intermediate checksum from the backend application layer to a storage layer for storing the final checksum and the intermediate checksum in association with the second unit of data.

9. The device of claim 8, wherein the computer process further comprising storing the final checksum and intermediate checksum together with the data block at the storage layer.

10. The device of claim 9, wherein each of the intermediate checksum and the final checksum is an MD5 checksum.

11. The device of claim 8, wherein the computer process further comprising:
reading a data block from the storage layer;
receiving the intermediate checksum and the final checksum from the storage layer; and
generating a final checksum of the read data block with intermediate checksum as the basis.

12. The device of claim 11, wherein the computer process further comprising comparing the final checksum of the read data block with the final checksum received from the storage layer.

13. The device of claim 12, wherein the computer process further comprising:
in response to determining that the final checksum of the read data block does not match with the final checksum received from the backend application layer, generating a data corruption error flag.

14. The device of claim 8, wherein the computer process further comprising adding unit identity of each of the first unit of data and the second unit of data during computation of checksum.

15. One or more processor-readable storage media encoding processor-executable instructions for executing on a computer system a computer process, the computer process comprising:
identifying a first unit boundary in a data block received from a client at an application layer, the first unit boundary indicating an end of a first unit of data;
generating an intermediate checksum based on the first unit of data at the application layer;
receiving a second unit of data of the data block at the application layer;
generating a final checksum with the intermediate checksum and the second unit of data as a basis; and
storing the final checksum and intermediate checksum together with the data block at a storage layer.

16. The one or more processor-readable storage media of claim 15, wherein each of the intermediate checksum and the final checksum is an MD5 checksum.

17. The one or more processor-readable storage media of claim 15, wherein the computer process further comprising:
reading a data block from the storage layer;
receiving the intermediate checksum and the final checksum from the storage layer; and
generating a final checksum of the read data block with intermediate checksum as the basis.

18. The one or more processor-readable storage media of claim 17, wherein the computer process further comprising comparing the final checksum of the read data block with the final checksum received from the storage layer.

19. The one or more processor-readable storage media of claim 17, wherein the computer process further comprising:
in response to determining that the final checksum of the read data block does not match with the final checksum received from the application layer, generating a data corruption error flag.

20. The one or more processor-readable storage media of claim 15, wherein the computer process further comprising adding unit identity of each of first the unit of data and the second unit of data during computation of checksum.

* * * * *